United States Patent
Boyd et al.

[15] 3,696,618
[45] Oct. 10, 1972

[54] CONTROL SYSTEM FOR AN ENGINE SYSTEM

[72] Inventors: David M. Boyd, Clarendon Hills; Clarence G. Gerhold, Palatine, both of Ill.

[73] Assignee: Universal Oil Products Company, Des Plaines, Ill.

[22] Filed: April 19, 1971

[21] Appl. No.: 135,199

[52] U.S. Cl..................60/276, 23/2 E, 23/288 F, 60/285, 60/289, 123/102, 123/119 R
[51] Int. Cl..............................F02b 75/10
[58] Field of Search.....60/276, 285, 289; 123/119 R, 123/102; 23/232 E, 254 E, 255 E, 288 F, 2 E

[56] References Cited
UNITED STATES PATENTS

| | | |
|---|---|---|
| 2,389,797 | 11/1945 | MacNeil....................60/276 |
| 3,031,267 | 4/1962 | Martin......................23/198 |
| 3,032,969 | 5/1962 | Barnes......................60/276 |
| 3,089,474 | 5/1963 | Lewis....................123/119 R |
| 3,168,806 | 2/1965 | Calvert....................60/284 |

Primary Examiner—Douglas Hart
Attorney—James R. Hoatson, Jr. and Ronald H. Hausch

[57] ABSTRACT

A control system for an engine system which has means for optimizing the performance of the converter in the engine system by regulating a set point of a controller. In one embodiment, secondary air flow to the converter is the variable utilized to control the performance of the converter and is regulated in response to the ratio of gas flow in respect to the engine of the system to secondary gas flow to the converter. In another embodiment the air to fuel ratio to the engine is utilized as a variable to control the performance of the converter.

15 Claims, 5 Drawing Figures

INVENTORS:
Clarence G. Gerhold
David M. Boyd

BY: *James R. Hoatson, Jr.*
*Ronald H. Hausch*
ATTORNEYS

CONTROL SYSTEM FOR AN ENGINE SYSTEM

The present invention relates to an improved engine system wherein fuel and air are admixed and combusted in an engine and the resulting exhaust gases containing harmful components are passed through a catalytic converter to be converted to generally harmless components. More particularly, the present invention relates to the method and means for controlling such an engine system by controlling the character of the input gases to the converter to obtain optimum performance of the converter.

The desirability of removing the noxious components of exhaust gases from an internal combustion engine has been generally well established. The unavoidably incomplete combustion of hydrocarbon fuel by an internal combustion engine results in the generation of substantial quantities of unburned hydrocarbons, oxides of nitrogen, and other undesirable products, which as waste products discharge into the atmosphere through the exhaust line. With the ever-increasing concentration of automobiles, particularly in urban areas, the resultant accumulation of these undesirable products in the atmosphere may reach high proportions. These combustion products are known to react with atmospheric gases to produce smog or pollution. Such waste products include, for example, saturated and unsaturated hydrocarbons, carbon monoxide, aromatics, partially oxygenated hydrocarbons, such as aldehydes, ketones, alcohols and acids, as well as oxides of nitrogen and sulfur.

In an ideal catalytic operation, the hot gases issuing from an engine exhaust manifold are passed through a catalytic bed or conversion zone maintained within a converter, so as to effect a more or less complete oxidation of carbon monoxide, and unburned hydrocarbons, as well as the reduction of the oxides of nitrogen to a harmless state.

It has been found that one of the difficulties encountered in the utilization of catalytic converters for effecting the conversion of exhaust gases to harmless components arises because of the fact that not only must hydrocarbons and carbon monoxide be oxidized to render them harmless, but the oxides of nitrogen present in the exhaust gas must be reduced. We have found that these reactions must occur under nearly ideal conditions in order to reduce harmful exhaust gas emissions appreciably. In the past, control of exhaust gas emissions has emphasized rendering harmless only the unburned hydrocarbons and carbon monoxide components of the exhaust gas issuing from the engine. This is evidenced by the fact that the automobile manufacturers in recent years have been operating their engines with lean carburetion settings. Thus, by providing excess oxygen, the automobile manufacturers have felt that the carbon monoxide and hydrocarbons would be oxidized in the exhaust manifold of the engine.

Even when catalytic converters have been used in the past they have not successfully reduced and oxidized all the components issuing from the engine. With the addition of secondary air, the converters have only been able to reduce the unburned hydrocarbons and the carbon monoxide. We have found means to control the character of the input gases to the converter almost instantaneously to thus maintain ideal reaction conditions in the converter.

Thus, it is a principal object of this invention to provide for an engine system having a catalytic converter which will effectively eliminate a substantial portion of the harmful components in the exhaust gas stream of the engine, including the unburned hydrocarbons, carbon monoxide, and the oxides of nitrogen.

More particularly, it is an object of this invention to provide the method and means for controlling the character of input gases to a catalytic converter of an engine system in a manner to optimize the performance of the converter to thus eliminate a substantial amount of harmful components from the exhaust gas stream.

Another object of the present invention is to provide a control system for an engine system which varies the air to fuel ratio to the engine to thus vary the character of input gases to a catalytic converter in the engine system.

Still another object of the present invention is to provide a control system for an engine system which varies the amount of secondary air to a catalytic converter in the engine system to thus vary the character of input gases to said converter.

In one of its broad aspects, the present invention provides for a control system in an engine system wherein fuel and air are admixed in an engine and the resulting exhaust gases containing harmful components are passed through a catalytic converter to be converted to generally harmless components. The control system comprises: (a) analyzing means connected to said converter for producing a signal indicative of the performance of the converter; (b) control means connected to said engine system for varying the character of the input gases to the converter, said control means including a regulatable set point; and, (c) optimizer means connected to the control means for optimizing the performance of the converter, said optimizer means including means for establishing an output signal for regulating the aforesaid set point and computer means for analyzing the signal indicative of the performance of the converter to determine an output signal necessary to approach an optimum performance of the converter.

In another aspect the present invention provides for a method of controlling an engine system wherein fuel and air are admixed and passed into an engine and the resulting exhaust gases containing harmful components are passed through a catalytic converter to be converted to generally harmless components comprising the steps of: (a) analyzing the converter to produce a signal indicative of the performance of said converter; (b) controlling the character of input gases to the converter responsive to a regulatable set point; and, (c) optimizing the performance of the converter by regulating the aforesaid set point in response to the signal indicative of performance of the converter.

The performance of the converter could be determined with an analyzer connected to the downstream end of the converter to determine the amounts of harmful components being emitted from the converter. Ideal performance of course would take place when no harmful components issue from the converter. Although this may be possible, we have found other less complicated means to generate a signal indicative of the performance of the converter quite accurately.

For example, we have found that the difference in temperature between the gases entering the converter and a representative temperature of the bed of catalyst is a good measurement indicative of the performance of the converter. Furthermore, we have found that when this temperature difference approaches a maximum, the overall performance of the converter approaches an optimum. In other words, tests have shown that the temperature difference between the gases coming into the converter and the bed of catalyst is maximum when the greatest percentage of all harmful components, including carbon monoxide, hydrocarbons, and oxides of nitrogen, are converted to harmless components. Thus, in a preferred embodiment the analyzing means includes means for measuring the temperature difference between the gases entering the converter and a representative temperature of the bed of catalyst.

Another index of performance has been found to be the ratio of combustibles to oxygen entering the converter. Tests have shown that when this ratio approaches stoichiometric amounts, the overall performance of the converter approaches optimum and the amounts of harmful components being emitted from the converter approach minimum quantities.

In one embodiment the control means includes means for introducing secondary air into the converter and means for regulating the amounts of secondary air to be introduced therein. The regulatable set point may comprise the volumetric flow rate ratio of:

gas flow in respect to the engine; to, secondary air flow to the converter. In this embodiment ratio analyzing means is provided for producing a signal representing the actual volumetric ratio in the engine system. Preferably the ratio analyzing means is comprised of means for establishing a first signal representing inlet manifold pressure of the engine, means for establishing a second signal representing speed of the engine, and means for multiplying the first signal by the second signal in such a manner to produce a signal responsive to the gas flow through the engine. Such ratio analyzing means has been found to quickly determine a gas flow rate with respect to the engine without affecting engine operation, and thus the control means may respond very quickly to change the secondary air flow to the converter during deceleration and acceleration modes of the engine.

In another embodiment wherein the regulatable set point is the ratio of gas flow to secondary air flow, the ratio analyzing means includes means for establishing a signal representing the volumetric exhaust gas flow rate from the engine to produce a signal responsive to the gas flow in respect to the engine. This is another approach which will quickly determine a gas flow rate with respect to the engine without affecting the engine operation, and thus the control means will respond quickly to change the secondary air flow to the converter during deceleration and acceleration modes of the engine.

In still another embodiment the control means will include means for varying the air to fuel ratio to the engine. The preferred embodiment of this approach includes a pressure regulating means connected to the float bowl chamber of the engine system for regulating the pressure in the float bowl chamber. The pressure regulating means may be comprised of a self-regulating back pressure valve in a vacuum line or air bleed line connected to the float bowl. This valve could be connected to a tension spring having regulatable tension or a valve in the vacuum line or air bleed line. The tension, being regulatable, will establish the set point of the control system. Alternately the pressure regulating means may include a control valve in a vacuum line or air bleed line connected to the float bowl and controlled by conventional controlling means.

The design and construction of the present improved engine system, as well as other advantageous features in connection therewith, are better set forth and explained by reference to the accompanying diagrammatic drawing and the following description thereof.

DESCRIPTION OF THE DRAWING

In FIG. 1 there is shown automotive type internal combustion engine 1 which is provided with a carburetor 2 and a carburetor air filter 4. The engine is further provided with an intake manifold 5 which distributes the air-fuel mixture to each cylinder and an exhaust manifold 6 which discharges into exhaust pipe 7. Exhaust pipe 7 is connected to a catalytic exhaust gas converter 8 which has a bed of catalyst 9 with suitable catalyst material 10 disposed therein. The treated effluent from the converter 8 is discharged to the atmosphere through tail pipe 11. Secondary air is introduced into the exhaust system via pipe 12. A blower or other suitable air supply means 13 is utilized to supply the secondary air to the exhaust system. A control valve 14 in line 12 is utilized to control the amount of secondary air introduced into the exhaust gas system.

Figure 1:
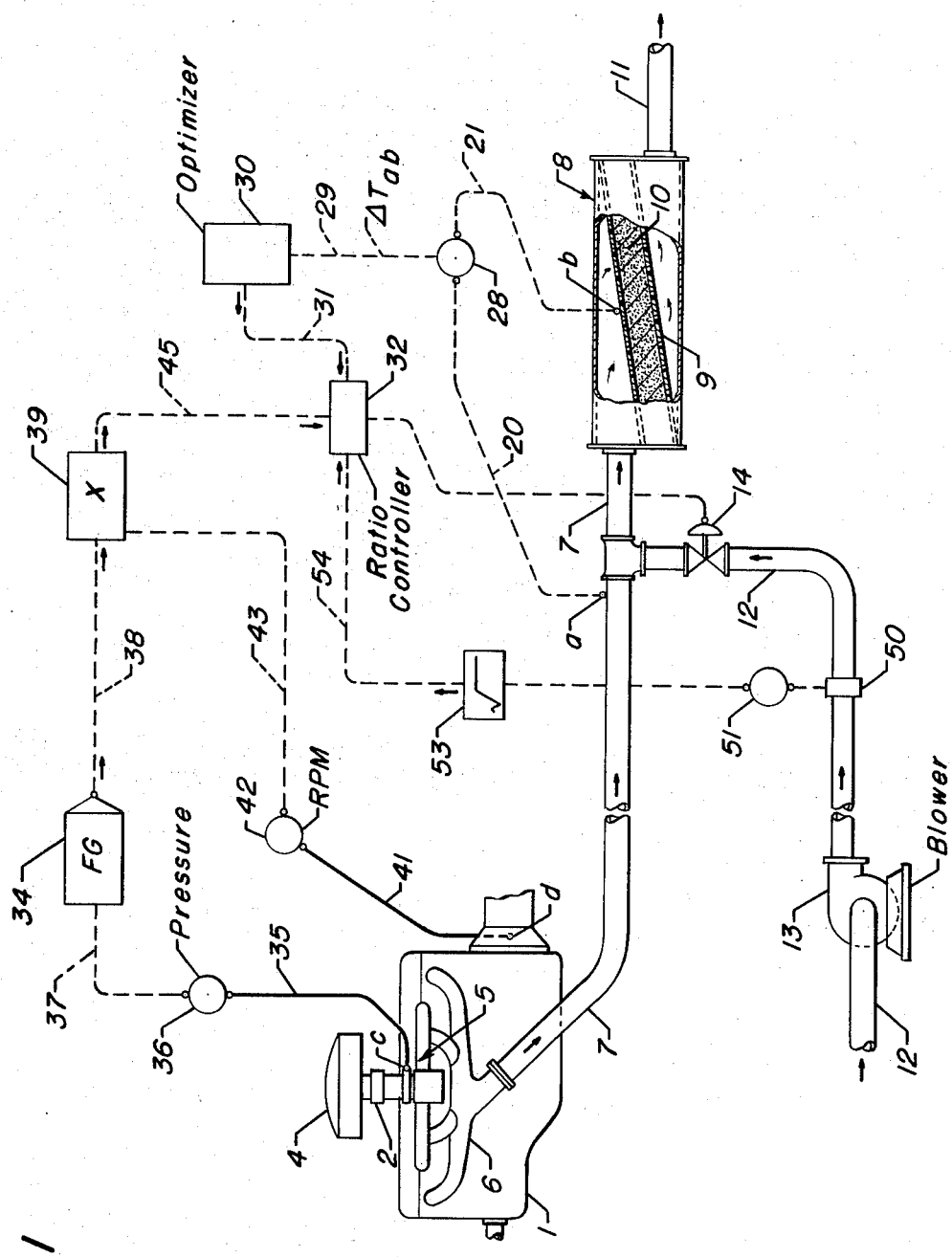
FIG. 1 of the drawing is a schematical illustration of one embodiment of the engine system of the present invention.

In this preferred embodiment two temperature devices a and b are placed in the engine system. Device a is placed on pipe 7 in a position to measure the temperature of gases entering the converter. Preferably this temperature is measured ahead of where the cold secondary air comes in for if measured after the point of introduction error may be introduced into $\Delta T_{ab}$. Device b is positioned on the inlet screen of the catalytic bed 9 to measure a representative temperature of the catalyst bed. Of course, these devices may be placed in other locations and those shown are only by way of example. Both of the temperature measuring devices a and b are connected through suitable lines or transmitting means 20 and 21 respectively to a differential temperature measuring and controlling device 28, the latter being suitable to measure, transmit, and indicate the temperature differential $\Delta T_{ab}$. Temperature differential $\Delta T_{ab}$ represents a signal which we have found is indicative of the performance of the converter. The differential temperature transmitting device 28 connects through a suitable line or transmitting means 29 to an optimizer means 30 which in turn is suitable to receive impulses corresponding to the variations in temperature $\Delta T_{ab}$. The optimizer 30 has output means for establishing a signal for regulating the set point of the ratio controller 32. Optimizer means 30 is further comprised of computer means for analyzing the signal $\Delta T_{ab}$ which is indicative of the performance of the converter to determine an output signal necessary to approach an optimum performance of the converter. The optimizer 30 is connected through line 31 to the ratio control means 32 which makes adjustments to the flow control valve 14 as may be required responsive to a comparison to the flow in respect to the engine and the secondary flow through conduit 12 utilizing the regulated set point determined by optimizer 30.

In order to follow quick changes in engine performance to rapid acceleration or deceleration, a gas flow in respect to the engine is measured indirectly by first measuring the manifold pressure and multiplying this by the engine rpm. Thus, a pressure device c communicating with the intake manifold is placed on engine 1. The pressure device c is connected via a suitable transmitting line 35 to a pressure measuring device 36, the latter being suitable to measure, transmit, and indicate pressure variances. The pressure measuring device 36 connects through a suitable line or transmitting means 37 to a function generator 34 which in turn is suitable to receive impulses corresponding to the variations in pressure and vary such impulses in a predetermined manner. From the function generator the impulse is transmitted means 38 to a multiplier 39. A speed indicating device d is positioned on the drive shaft of the engine. This device d is connected through a suitable line or transmitting means 41 to a measuring and controlling device 42, the latter being suitable to measure, transmit, and indicate the rpm of the engine. Likewise, the rpm measuring and controlling device 42 is connected through suitable lines or transmitting means 43 to multiplier 39. The multiplier 39 is a device which gives the instantaneous product of two-time varying voltages. The multiplier thus instantaneously multiplies the signal from the function generator in line 38 and the signal from the speed indicator 42 from line 43 to obtain a flow value through the engine. The multiplier is connected to the ratio controller 32 via transmitting means 45.

To obtain the value of secondary air flow, an orifice 50 is provided in line 12. A differential pressure transmitter 51 is connected across the orifice to establish a signal which is representative of a differential pressure across the orifice. The signal from the pressure transmitter 51 is supplied to a square root means 53. The output signal of the square root means 53, representative of the flow through pipe 12, is transmitted through line 54 to the ratio controller. Ratio controller senses the value of gas flow from line 45 and secondary air flow from line 54 and makes changes in the flow through pipe 12 via control valve 14 in response to the set point ratio as determine by the optimizer 30.

The components of the control system shown in FIG. 1 are well known to those skilled in the art. The various transmitting lines, transmitters, square root means, multipliers, controllers, optimizers, etc., are available commercially from any number of reputable instrument manufacturers.

Figure 5:
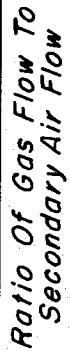
FIG. 5 of the drawing is a schematical curve indicating the hypothical performance of a converter.

The optimizer 30 is a device well known in the art which maximizes or minimizes some measure of process performance. By way of example, assume that the converter's performance may be determined by $\Delta T_{ab}$ and that $\Delta T_{ab}$ varies with the ratio of gas flow with respect to the engine to secondary air according to the schematical curve shown in FIG. 5. It is noted that $\Delta T_{ab}$ goes through a maximum at point G where the slop of the curve is O. If the converter is operating at the position as shown at point F on the curve, the optimizer computer will change the ratio set point of gas flow to secondary air so that the performance of the converter will approach G on the curve. Likewise, if point H is the point on which the converter is operating, the optimizer will decrease the ratio of gas flow to secondary air to approach point G. Reference may be made to pages 22-52 through 22-54 of the Fourth Edition of *Perry's Chemical Engineering Handbook*, published by McGraw-Hill Book Company for a brief description of optimizer theory.

There are various types of optimizers on the market, including the Motorola Veritrak Performance Optimizer Controller manufactured by Motorola, Instrumentation and Control Inc. of Phoenix, Arizona, a subsidary of Motorola Inc. This particular optimizer is an analog computer that operates on the principle of introducing small changes into the ratio of secondary air to gas flow, and noting the effect on the performance index of the process. By noting the effect, it can reach a decision to change the set point to approach an optimum performance of the converter.

Figure 2:
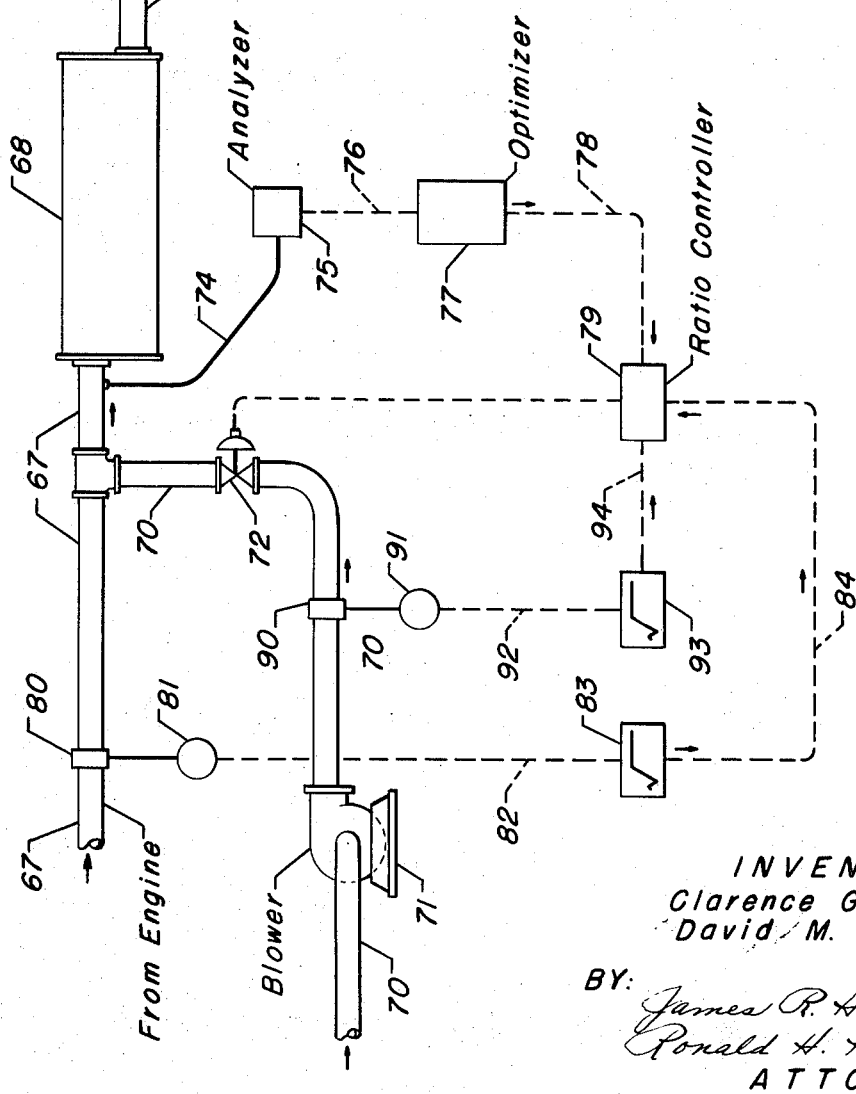
FIG. 2 of the drawing is a schematical illustration of an alternate embodiment of the engine system of the present invention.

Referring now to FIG. 2 of the drawing, there is shown an alternate embodiment of the present invention. In this particular drawing the engine of the system is not shown; however, the exhaust line 67 is shown which carries the exhaust gases from the exhaust manifold of an engine to the converter 68 where the gases are converted in a catalyst bed (not shown) and discharged through pipe 69 to the atmosphere. A secondary air pipe 70 connects to pipe 67 for introducing the secondary air supplied by blower 71. A control valve 72 is placed in line 70 for controlling the amounts of secondary air entering the converter 68. In this particular case, the performance of the converter is determined indirectly by measuring the ratio of combustible materials to oxygen entering the converter. This is accomplished by withdrawing a small amount of exhaust gases from pipe 67 through a line 74 and analyzing the sample in analyzing means 75. The analyzer 75 may be one of the many commercially available analyzers. By way of example, analyzer 75 may contain a platinum filament which is made part of a wheatstone bridge and through which a continuous current is transmitted. The combustible materials are continuously burned around the platinum filament in the presence of available oxygen in the line 74. As the filament gets hotter it puts the wheatstone bridge out of balance since the filament is one branch of the of We have found that the optimum performance of the converter coincides to the temperature peak signal in such an analyzer. This peak is thought to be the stoichiometric ratio of combustibles to oxygen in the exhaust gases.

The signal from the analyzer 75 is transmitted via transmitting means 76 to an optimizer means 77 similar to the one described in FIG. 1. The optimizer has computer means for analyzing the signal from analyzer 75 to determine an output signal necessary to approach an optimum performance of the converter. The output signal would regulate the ratio set point of ratio controller 79. This output signal is transmitted via transmitting line 78 to the ratio controller 79.

In this particular embodiment, the flow in respect to the engine is determined by measuring the pressure differential across an orifice 80 in pipe 67 through pressure means 81, transmitting this signal over transmitting means 82 to square root means 83 whose output indicates the exhaust gas flow through pipe 67 to thus produce a signal responsive to exhaust gas flow. This output signal is transmitted via transmitting means 84 to the ratio controller 79. In a similar manner, the flow of secondary air is determined by measuring the pressure differential across an orifice 90 through the pressure means 91, transmitting this signal via transmitting means 92 to a square root means 93 whose output indicates the flow of secondary air through conduit 70. This output signal is transmitted to the ratio controller via transmitting means 94. The ratio controller regulates the secondary air flow through line 70 in response to the ratio of exhaust gas flow through line 67 to secondary air flow through line 70 utilizing the regulated set point ratio from optimizer 77.

Both embodiments illustrated operate in a similar manner with different indices of performance controlling the flow of secondary air. In the case of the embodiment of FIG. 1, assuming that the flow through line 7 remains constant, the optimizer would adjust the ratio of secondary air flowing into line 7 via line 12 to approach an optimum $\Delta T_{ab}$ which would correspond to point G on the hypothetical curve of FIG. 5. If the engine accelerates, pressure controller 36 will transmit a signal via lines 37 and 38 to the multiplier while the rpm indicator 42 will transmit a signal 43 to the multiplier 39 where instantaneously a valve corresponding to the flow through conduit 7 will be transmitted to the ratio controller. During acceleration, this value will increase because of the increased amounts of gas flowing through the engine and thus ratio controller will open valve 14 to allow more secondary air flow to be discharged into the line to the converter. The function generator 34 is utilized to linearize the signal from the pressure measuring device 36. The amount of secondary air discharged into the converter will again depend on the regulated set point ratio as determined by the optimizer at any given point in time. If at the new mode of operation the optimizer determines that a different ratio is needed to approach an optimum conversion of exhaust gases, it will change or regulate the regulated set point transmitted to the ratio controller 32. Of course, during deceleration, valve 14 will be closed down by the ratio controller 32.

In the embodiment of FIG. 2 instead of using the rpm and intake manifold pressure of the engine to determine flow with respect to the engine the pressure differential across an orifice 80 in the line from the engine is utilized to determine flow with respect to the engine. Furthermore, the optimizer 77 does not read a signal of temperature difference between inlet and bed conditions but reads a signal from analyzer 75 to regulate the set point of the ratio controller 79. The optimizer varies the set point ratio of secondary air to gas flow in respect to the engine to approach the stoichiometric ratio of combustibles to oxygen in the exhaust pipe 67. If the engine is accelerating, the flow of gas through conduit 67 will increase, and a signal responsive to this increase will be transmitted via line 84 to the ratio controller will adjust the flow through line 70 via valve 72 until the set point ratio determined by optimizer 77 is reached.

Figure 3:
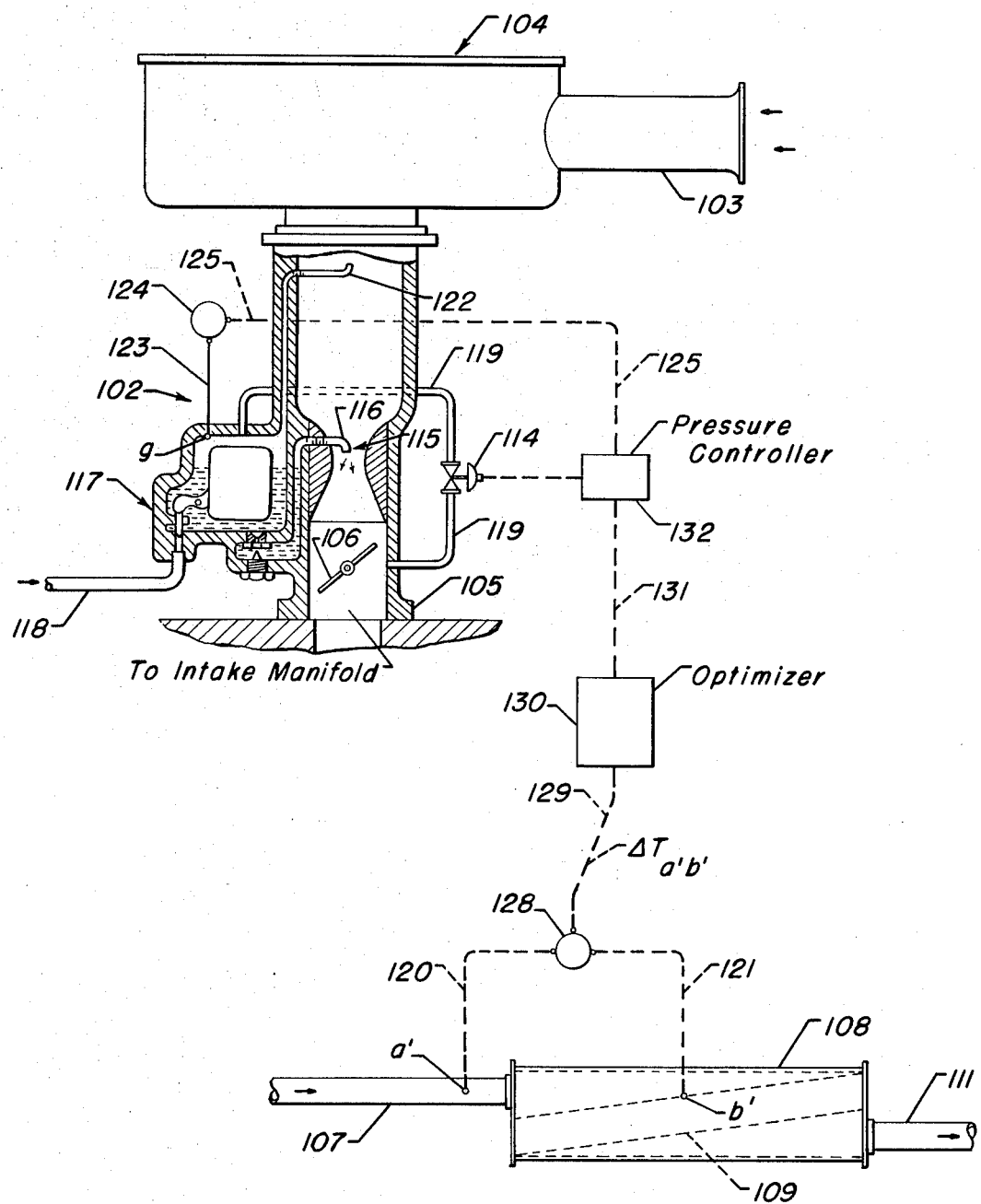
FIG. 3 of the drawing is a schematical illustration of still another embodiment of the engine system of the present invention.

Reference is now made to FIG. 3 of the drawing where still another embodiment of the engine system utilizing a control system that varies the air to fuel ratio of the engine is shown diagrammatically. In FIG. 3 there is shown, partially in section, a carburetor 102 which is comprised of an air filter housing section 104, a float bowl section 117, and a venturi mixing section 115. The carburetor 102 is of course adapted to be connected to an engine intake manifold (not shown) at outlet 105. There is also shown a suitable throttle 106 and a fuel inlet 116 in the venturi mixing section 115 which draws its supply from the float bowl 117. A passageway 122 is provided from the float bowl section 3 into the top inlet end of the carburetor to serve as the venting means for the float bowl. There is provided an air intake opening 103 in the air filter housing 104 for introducing air into the carburetor. A fuel line 118 from the fuel pump (not shown) is provided to supply fuel to the float bowl section 117. Thus, a means is provided for introducing air into the carburetor 102 to the venturi mixing section 115 where it is mixed with gasoline which is introduced from the float bowl section 117 by way of a fuel inlet means or nozzle 116 to in turn provide an air to fuel mixture to the engine.

We have found that the air to fuel ratio to the engine may be regulated by pulling a partial pressure on the float chamber enclosure 117. By way of example tests have been made on an unloaded engine at 1,600 rpm with an initial air to fuel ratio of 12.6 at atmospheric pressure. By pulling partial pressures of one-fourth, three-eights, and one-half inches of water vacuum on the float chamber air to fuel ratios of 13, 13.3, and 13.5 respectively were obtained. This feature has given us an excellent tool to vary the character of the input gases to a converter located downstream of the engine.

The engine system of this invention is further comprised of a catalytic converter 108 having a catalyst bed or retaining section 109 disposed therein. The inlet of the converter is connected to the engine (not shown) via exhaust pipe or conduit 107. The outlet of the converter is connected to tail pipe 111. As was the case in FIG. 1 of the drawing, there are provided two temperature devices $a'$ and $b'$ which are placed in the engine system. Device $a'$ is located on pipe or conduit 107 in a position to measure the temperature of the gases entering the converter. Device $b'$ is positioned on the inlet screen of the catalyst bed 109 to measure a representative temperature of the bed. Both of the temperature devices $a'$ and $b'$ are connected through suitable transmitting lines 120 and 121 respectively to differential temperature measuring and controlling device 128, the latter being suitable to measure, transmit, and indicate the temperature differential, $\Delta T a'b'$. Temperature differential, $\Delta T a'b'$, represents a signal which we have found to be indicative of the performance of the converter. The temperature transmitting device 128 connects through a suitable transmitting line 129 to optimizer means 130 which in turn is suitable to receive impulses according to the variations in temperature $\Delta T a'a0$. As was the case in the embodiments of FIG. 1 and FIG. 2, the optimizer 130 has output means for establishing a signal for regulating the set point of the control means, pressure controller 132. The optimizer 130 is further comprised of computer means for analyzing the signal $\Delta T a'b'$ to determine the output signal necessary to approach the optimum performance of the converter. Optimizer 130 is connected through transmitting line 131 to pressure controller 132 which makes adjustments to the control valve 114 as may be required responsive to the comparison of measured pressure of the float bowl section to set point pressure determined by optimizer 130. The control valve 114 is connected in a vacuum line 119 which is connected to the downstream side of the venturi mixing section 115 which is a vacuum source, and to the float blow section 117. A pressure device g is connected to float bowl section 117. Pressure device g is in turn connected via transmitting line 123 to a pressure measuring device 124, the latter being suitable to measure, transmit, and indicate pressure variances. The pressure measuring device 124 connects through a suitable line or transmitting means 125 to the pressure controller 132.

The operation of the engine system of FIG. 3 follows: After engine operation begins a certain air to fuel ratio determined by atmospheric pressure, throttle setting, flow through fuel jets, etc., will be established. Assuming the flow through line 107 to the converter is not of a character to optimize the converter performance, optimizer 130 would adjust the set point of pressure controller 132 which in turn would affect the operation of control valve 114. The optimizer would read the $\Delta T a'b'$ signal and determine a decision necessary to approach optimum performance in the converter. If this decision calls for greater amounts of oxygen, a partial pressure would be pulled in the float bowl chamber 117 by adjustment of valve 114. This would in effect increase the ratio of air to fuel introduced into the intake manifold of the engine. This procedure would continue with the optimizer continuously analyzing the signal $\Delta T a'b'$ and determining the output signal necessary to approach an optimum performance of the converter.

Figure 4:
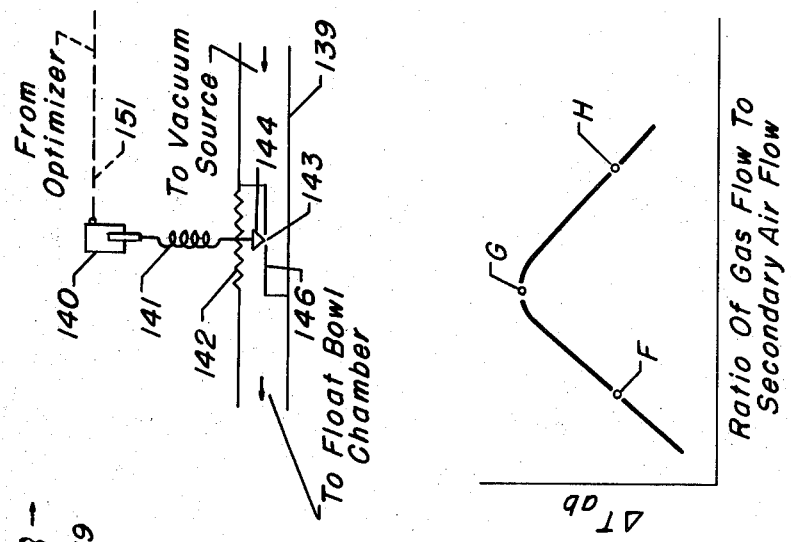
FIG. 4 is a schematical illustration of one means for controlling the pressure in the float bowl chamber of an engine system.

In FIG. 4 there is illustrated a simplified means for controlling and regulating the pressure in the float bowl enclosure 117 such as shown in FIG. 3. A vacuum line 139 similar to the vacuum line of 119 of FIG. 3 may be connected to the vacuum source of the carburetor (not shown) and to the float chamber of carburetor (not shown). A self-regulating back pressure valve 145 is shown to comprise a flexible diaphragm 142 which is connected to a valve 144 positioned over an opening 143 in partition 146 across the vacuum line. This particular self-regulating valve is represented diagrammatically and is similar to back pressure valves used to maintain constant pressure in natural gas lines for consumer use. As the pressure increases on the diaphragm side of the opening 143, diaphragm 142 will push outwardly, causing the valve to open to thus supply more vacuum to the float chamber or diaphragm side of the valve. As can be seen, this operation is self-regulating in effect. The set point of valve 145 is determined by tension in a spring 141 connected to the diaphragm 142. The tension spring is connected to an electrically activated device 140 which may be a bimetallic element electrically heated by the output of the optimizer (not shown) connected to the device via transmitting line 151. As the output from the optimizer changes, the bimetallic element will change the tension of operation 141 and consequently the set point to the valve 145.

The illustrations as shown here are schematical by nature and should not be construed as limiting upon the present invention. As mentioned before, the components of the control system are well known by those skilled in the art and the various transmitters, controllers, multipliers, optimizers, etc., are available commercially from any number of reputable instrument manufacturers. Of course, substitutions for equipment may be made without diverting from the scope of the present invention. Furthermore, the character of the input gases to the converter may be controlled by other means than described. For example instead of pulling a partial pressure on the fuel float bowl, fuel variation through other methods may be employed such as controlling the choke. Moreover, the present invention should not be limited to a standard float bowl-carburetion system, but may be used in conjunction with fuel injection system. In addition, fuel injection after the engine and before the converter is considered to be within the scope of this present invention to vary the character of input gases to the converter.

We claim as our invention:

1. In an engine system wherein fuel and air are admixed and passed in an engine and the resulting exhaust gases containing harmful components are passed through a catalytic converter to be converted to generally harmless components, a control system comprising in combination:
   a. analyzing means connected to said converter for producing a signal indicative of the performance of the converter;
   b. control means connected to said engine system for varying the character of the input gases to the converter, said control means including a regulatable set point; and
   c. optimizer means connected to the analyzing means and to the control means for optimizing the performance of the converter, said optimizer means including means for establishing an output signal for regulating the aforesaid set point and computer means for analyzing the signal indicative of the performance of the converter to determine an output signal necessary to approach an optimum performance of the converter.

2. The control system of claim 1 further characterized in that said analyzing means includes means for measuring the temperature difference between the gases entering the converter and a representative temperature of the converter, the temperature difference thereof indicating the performance of the converter.

3. The control system of claim 1 further characterized in that said analyzing means includes means for measuring the ratio of combustible material to oxygen entering the converter, the ratio thereof indicating the performance of the converter.

4. The control system of claim 1 further characterized in that said control means includes means for introducing secondary air into said converter and means for regulating the amounts of secondary air to be introduced therein.

5. The control system of claim 4 further characterized in that said regulatable set point comprises the volumetric flow rate ratio of:
   gas flow in respect to the engine; to
   secondary air flow to the converter; and in that ratio analyzing means is provided for producing a signal representing the actual volumetric ratio thereof.

6. The control system of claim 5 further characterized in that said ratio analyzing means includes means for establishing a first signal representing inlet manifold pressure of the engine, means for establishing a second signal representing the speed of the engine, and means for multiplying the first signal by the second signal in a manner to produce a signal responsive to gas flow in respect to said engine.

7. The control system of claim 5 further characterized in that said ratio analyzing means includes means for establishing a signal representing the volumetric exhaust gas flow rate from the engine to produce a signal responsive to gas flow in respect to said engine.

8. The control system of claim 1 further characterized in that said control means includes means for varying the air to fuel ratio of the engine.

9. The control system of claim 8 further characterized in that the aforesaid means for varying the air to fuel ratio to said engine includes pressure regulating means connected to the float bowl chamber of the engine system for regulating the pressure in the float bowl chamber.

10. The control system of claim 9 further characterized in that said pressure regulating means comprises a self-regulating back pressure valve connected to a tension spring means having regulatable tension for establishing the regulatable set point of said control system.

11. A method of controlling an engine system wherein fuel and air are admixed and passed into an engine and the resulting exhaust gases containing harmful components are passed through a catalytic converter to be converted to generally harmless components comprising the steps of:
   a. analyzing the converter to produce a signal indicative of the performance of said converter;
   b. controlling the character of input gases to the converter responsive to a regulatable set point; and,
   c. optimizing the performance of the converter by regulating the aforesaid set point in response to the signal indicative of the performance of the converter.

12. The method of claim 11 wherein the converter is analyzed by measuring the temperature difference between the gases entering the converter and a representative temperature of the converter.

13. The method of claim 11 wherein the character of input gases to the converter is controlled by introducing secondary air into the exhaust gases.

14. The method of claim 13 wherein said regulatable set point comprises the flow rate ratio of:
   gas flow in respect to the engine; to
   secondary air flow to the converter.

15. The method of claim 11 wherein the character of input gases to the converter is controlled by varying the air to fuel ratio to the engine.

* * * * *